(12) United States Patent
Gildein, II et al.

(10) Patent No.: US 9,632,900 B1
(45) Date of Patent: Apr. 25, 2017

(54) ACTIVE WORKSTATION

(71) Applicant: International Business Machines Corporation, Armonk, NY (US)

(72) Inventors: Michael E. Gildein, II, Wappingers Falls, NY (US); Vijai Kalathur, Wappingers Falls, NY (US); Rajaram B. Krishnamurthy, Pleasant Valley, NY (US); Moses J. Vaughan, Mahwah, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/179,532

(22) Filed: Jun. 10, 2016

Related U.S. Application Data

(63) Continuation of application No. 14/933,587, filed on Nov. 5, 2015.

(51) Int. Cl.
  *G06F 11/30* (2006.01)
  *H04L 29/08* (2006.01)
  *G06F 1/32* (2006.01)
  *G06F 3/06* (2006.01)

(52) U.S. Cl.
  CPC ........ *G06F 11/3048* (2013.01); *G06F 1/3287* (2013.01); *H04L 67/34* (2013.01)

(58) Field of Classification Search
  None
  See application file for complete search history.

(56) References Cited

U.S. PATENT DOCUMENTS

| | | | |
|---|---|---|---|
| 2014/0125575 A1* | 5/2014 | Samanta Singhar | ... G06F 3/005 345/156 |
| 2015/0120377 A1* | 4/2015 | Marvit | ............... G06Q 30/0201 705/7.29 |

OTHER PUBLICATIONS

List of IBM Patents or Patent Applications Treated as Related; (Appendix P), Filed Nov. 5, 2015; 2 pages.
Michael E. Gildein, "Active Workstation", U.S. Appl. No. 14/933,587, filed Nov. 5, 2015.

* cited by examiner

*Primary Examiner* — Scott Sun
(74) *Attorney, Agent, or Firm* — Cantor Colburn LLP; Steven Chiu

(57) ABSTRACT

An active workstation is provided and includes a first support element, a computing device to which peripheral devices, which are movably disposed on the first support element, are coupled and a second support element movably disposed proximate to the first support element. The computing device includes a processing unit and a memory having executable instructions stored thereon. When executed, the executable instructions cause the processing unit to facilitate respective operations and movements of the peripheral devices and the second support element in accordance with a user profile.

3 Claims, 6 Drawing Sheets

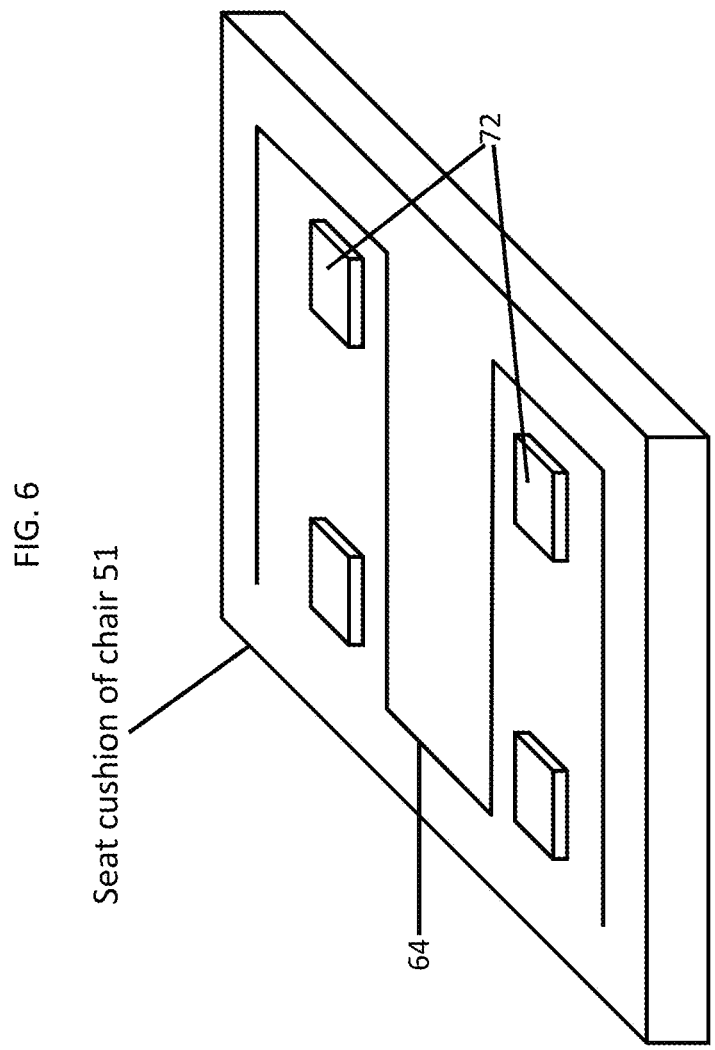

ACTIVE WORKSTATION

CROSS-REFERENCE TO RELATED APPLICATION

This application is a continuation of and claims the benefit or priority to U.S. application Ser. No. 14/933,587, which was filed on Nov. 5, 2015. The entire contents of U.S. application Ser. No. 14/933,587 are incorporated herein by reference.

BACKGROUND

The present invention relates to an active workstation and, more specifically, to an active workstation that provides a user a customized work experience that can travel with the user via a mobile or physical device profile and offer similar productivity setups regardless of a geographical location of the user.

A majority of home or office desk workers have a general setup of some or all of the following components: an office chair, a keyboard, a mouse, a monitor (possibly 2), a footrest, pens/pencils and a writing pad. With these components arranged together, they present a constant struggle for an individual to stay within a comfortable and ergonomically correct position to an extent that office desk workers may suffer medical problems such as carpal tunnel, back problems and muscle strains over a long period of office work.

There are currently no known solutions to this issue. Moreover, as users become increasingly interested in using mobile devices, like phones or tablets, at their current workstations, complications due to additional devices being added to their workstation may ensue.

SUMMARY

According to an embodiment of the present invention, an active workstation is provided and includes a first support element, a computing device to which peripheral devices, which are movably disposed on the first support element, are coupled and a second support element movably disposed proximate to the first support element. The computing device includes a processing unit and a memory having executable instructions stored thereon. When executed, the executable instructions cause the processing unit to identify a current condition and to facilitate respective operations and movements of the peripheral devices and the second support element in accordance with a user profile and the current condition.

According to another embodiment of the present invention, an active workstation for multiple users is provided and includes multiple first support elements, multiple computing devices to which peripheral devices, which are movably disposable on one or more of the multiple first support elements, are coupled and multiple second support elements movably disposable proximate to one or more of the multiple first support elements. The multiple computing devices each include a processing unit and a memory having executable instructions stored thereon. When executed, the executable instructions cause the processing unit to identify current conditions and to facilitate respective operations and movements of the peripheral devices and the multiple second support elements in accordance with one of multiple user profiles respectively associated with each of the multiple users and the current conditions.

According to another embodiment of the present invention, a computer-implemented method of controlling an active workstation is provided. The computer-implemented method includes sensing that a user is positioned to use a computing device, identifying a current user activity, determining, at a processing unit of the computing device, that a user profile of the user exists and, in an event that a user profile of the user exists, facilitating, at the processing unit, respective operations and movements of peripheral devices, which are movably disposed on a first support element and coupled to the computing device, a second support element, which is movably disposed proximate to the first support element, and surrounding elements in accordance with the user profile and the current user activity.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 6 is a schematic illustration of pressure sensors of the active workstation of FIG. 1 in accordance with embodiments;

DETAILED DESCRIPTION

As described below, a customized active workstation that is sensitive to the needs of its user or users is provided by embodiments. This "active workstation" can provide a multitude of individuals a customized experience with a single setup of computing devices and peripheral components.

Figure 1:
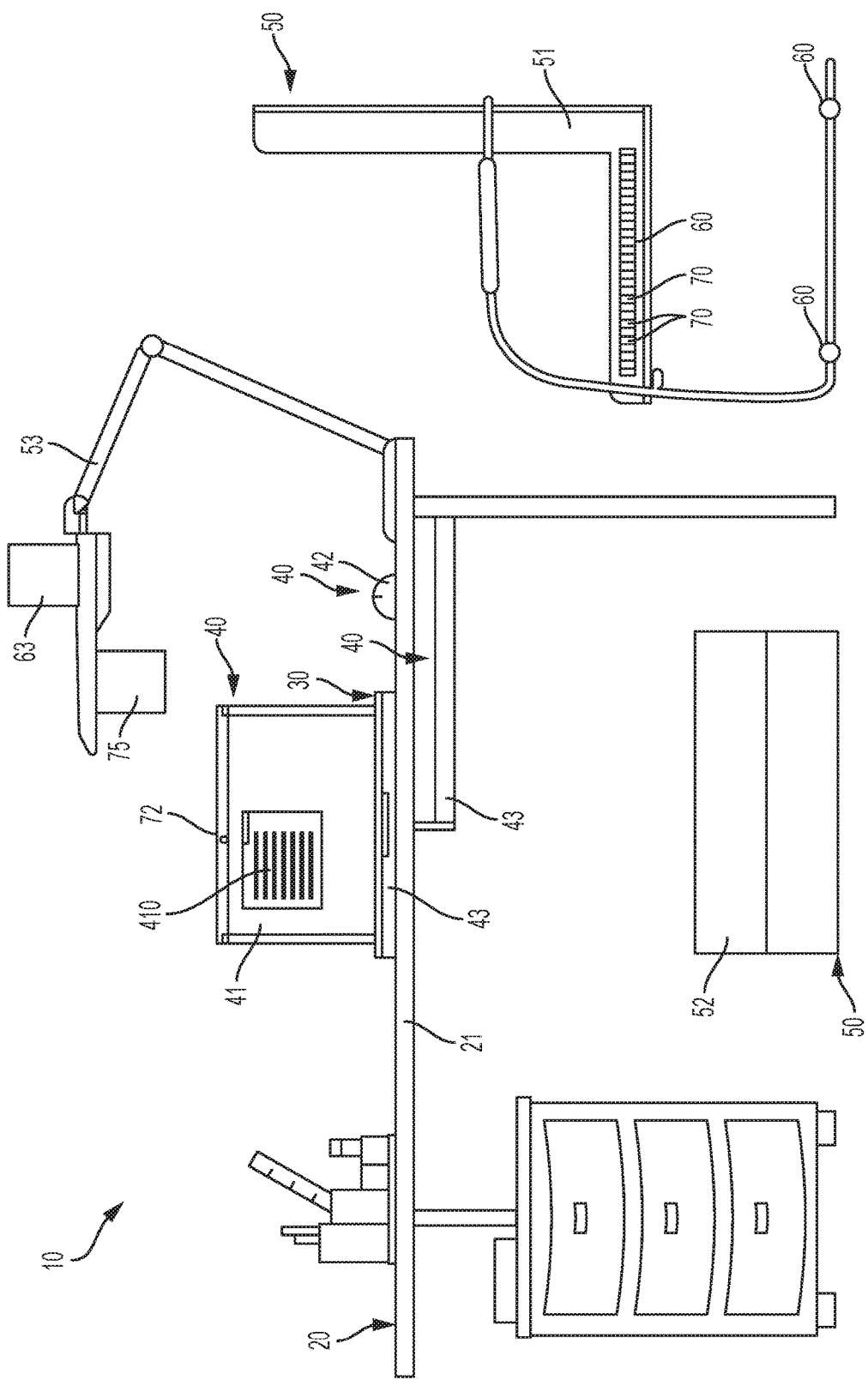
FIG. 1 is a schematic illustration of an active workstation in accordance with embodiments.

With reference to FIG. 1, an active workstation 10 is provided and includes a first support element 20, a computing device 30, peripheral devices 40 and a second support element 50. The first support element 20 may be provided, for example, as a desk 21 or a table. The computing device 30 may be any type of server or personal computing device, such as a desktop computer, or mobile computing device, such as a laptop, a tablet or a smartphone. The peripheral devices 40 may include, for example, a monitor 41, a mouse 42 and a keyboard 43, and are movably disposable on an upper surface of the first support element 20. That is, the peripheral devices 40 may be moved, positioned or repositioned anywhere on the upper surface of the first support element 20. The second support element 50 may be provided as a chair 51 and a footrest 52 for physical support of a user and as a light fixture 53 for atmospheric support of user activities. The second support element 50 is movably disposable proximate to the first support element 20. That is, the second support element 50 may be operated, moved, positioned or repositioned anywhere proximate to the first support element 20.

Figure 2:
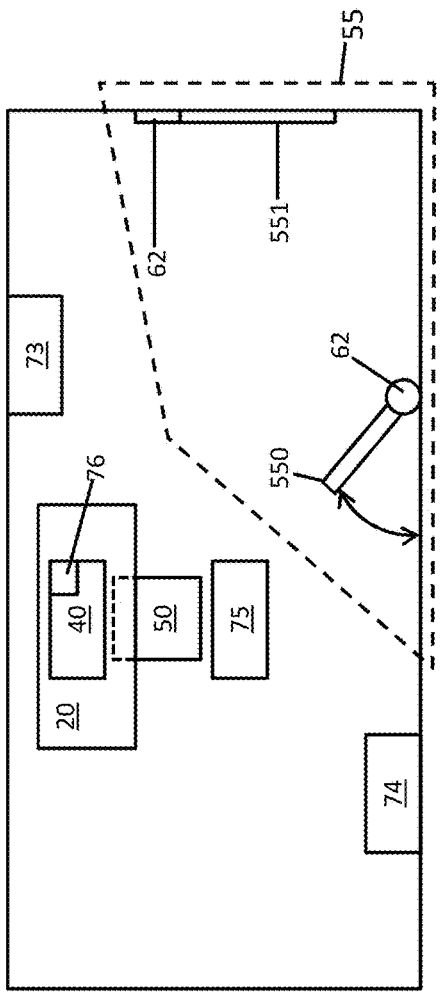
FIG. 2 is a plan view of surrounding elements of the active workstation of FIG. 1.

With reference to FIG. 2, the active workstation 10 may further include surrounding elements 55, such as for example, a door 550 and a window shade 551. The door 550 is pivotable about its hinges and the window shade 551 is extendable and retractable in vertical directions. The light fixture 53 may be included in the active workstation 10 as a component of the second support element 50, as explained above, or as a surrounding element 55. For purposes of clarity and brevity, the following description will relate to the case where the light fixture 53 is a second support element 50.

Figure 3:
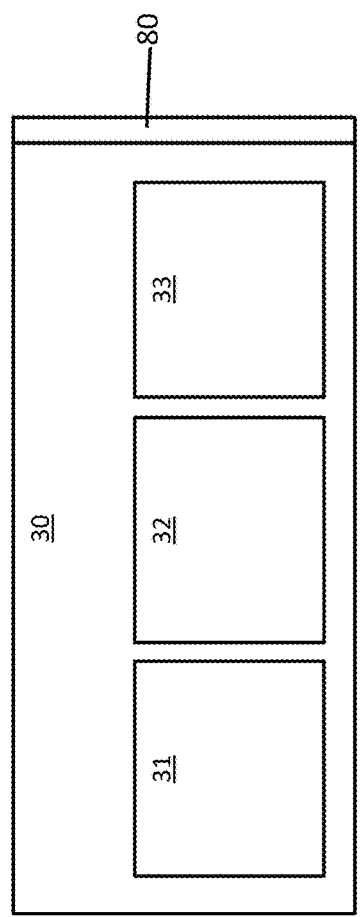
FIG. 3 is a schematic diagram of a computing device of the active workstation of FIG. 1 in accordance with embodiments.

With reference to FIG. 3, the computing device 30 includes a processing unit 31, a memory 32 and a networking unit 33. The memory 32 may be provided as any type of random access, read/write or read only memory and has executable instructions stored thereon. When executed, the executable instructions cause the processing unit 31 to identify a current condition in and around the active workstation 10 (e.g., to identify a user activity) and to facilitate respective operations and movements of the peripheral devices 40, the second support element 50 and the surrounding elements 55 in accordance with a user profile and the identified current condition. The active workstation 10 is thus dynamically adaptable to the user profile and to the identified current condition.

As used herein and, as will be explained below, the facilitation of the respective operations and movements may refer to actual commands issued by the processing unit to servo elements 60 within the peripheral devices 40, the second support element 50 and the surrounding elements 55 that cause the servo elements 60 to move or to operate the peripheral devices 40, the second support element 50 and the surrounding elements 55. Alternatively, the facilitation of the respective operations and movements may refer to instructions provided to the user as how to manually move or to operate the peripheral devices 40, the second support element 50 and the surrounding elements 55.

In accordance with embodiments, the user profile may be set up on the computing device 30 by the user or derived from a stored user profile on at least one or more of a network, an external computing device and a mobile computing device. In the former case, the processing unit 31 may present the user a graphical user interface (GUI) 410 by way of the monitor 41 at some initial time. The user can thus be prompted to enter one or more of his size and weight, his physical limitations, his injuries and his comfort preferences by way of the GUI 410 so that the processing unit 31 can generate a suggested initial arrangement of the peripheral devices 40, the second support element 50 and the surrounding elements 55. In the latter case, the user profile can be previously stored or generated or input by the user through the GUI 410 on another computing device (e.g., a tablet or smartphone). Once it is set, the user profile is one or more of persistent, updateable and time-variant.

The persistence of the user profile is characterized in the fact that the user profile may remain in a stored condition until it is selectively modified by the user or adjusted based on a known change in the user's physical condition (i.e., a size/weight increase or a known injury). The user profile is manually or automatically updateable by way of the GUI 410 or another similar updating system. For example, if the user begins to have pain in his back he may input back pain into the user profile himself. Alternatively, if the user is diagnosed with an injury, the diagnosis may be automatically inputted into his user profile from the diagnosing entity. The time variance of the user profile may refer to time-variance over long periods of time or short periods of time. That is, the user profile may be manually or automatically adjusted over months and years to account for the aging of the user, over minutes and hours to account for the user's natural tendency to become fatigued while sitting or standing and over seconds to account for the user's current activity changing (e.g., from reading to typing and vice versa).

Figure 5:
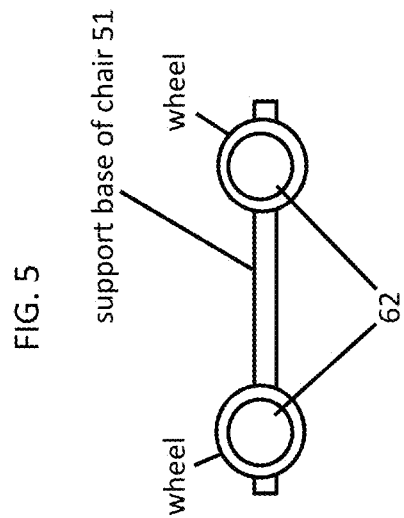
FIG. 5 is a schematic illustration of a rotary actuator of the active workstation of FIG. 1 in accordance with embodiments.
Figure 4:
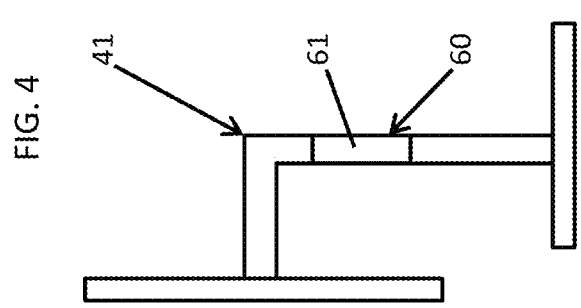
FIG. 4 is a schematic illustration of a linear actuator of the active workstation of FIG. 1 in accordance with embodiments.

In accordance with further embodiments and, with continued reference to FIGS. 1, 2 and 3 and with additional reference to FIGS. 4-6, the active workstation 10 may include servo elements 60, sensors 70 and power controllers 80, which are operable by the processing unit 31 to initiate a low power operational mode of the computing device 30, in particular, or the active workstation 10 as a whole. This low power operational mode may be initiated, for example, after a predetermined period of idle time (which can be manually or automatically set) or when the user is absent for a predetermined period of time (which can be manually or automatically set).

The servo elements 60 may be provided as electromechanical or pneumatic, linear actuators 61 (see FIG. 3), rotary actuators 62 (see FIGS. 2 and 4) or electronic actuators 63 (see FIG. 1) that include transmission/reception (T/R) units disposed in signal communication with the networking unit 33 of the computing device 30 and are configured to execute the respective operations and movements of the peripheral devices 40 and the second support element 50.

For example, as shown in FIG. 4, the monitor 41 may include a stand having a base portion that sits on the upper surface of the first support element 20, a display portion and an extendable spine portion, which extends from the base portion to the display portion and in which one of the linear actuators 61 is disposed. When this linear actuator 61 is activated and receptive of an extend or retract command from the computing device 30, the linear actuator 61 correspondingly extends or retracts to raise or lower the display portion of the monitor 41. As another example, as shown in FIG. 5, where the second support element 50 is the chair 51 and has a wheeled support system, rotary actuators 62 may be disposed at the wheels to drive motion of the chair 51 along a floor surface. As such, when these rotary actuators 62 are activated and receptive of a forward or reverse drive command from the computing device 30, the rotary actuators 62 correspondingly rotate to drive the chair 51 across the floor surface (the rotary actuators 62 in FIG. 2 can similarly be employed to pivot the door 550 between open and closed positions based on noise level readings and to raise or lower the window shade 551 based on ambient temperature readings or the movement of the sun during the day). As yet another example, as shown in FIG. 1, an electronic actuator 63 may be installed on the light fixture 53 as a dimmer to control a level of ambient light. As such, when the electronic actuator 63 is activated and receptive of a lighten or dimming command from the computing device 30, the electronic actuator 63 correspondingly lightens or dims the light fixture 53.

The servo elements 60 may also be provided as heating or cooling elements 64 in the seat cushions of the chair 51 so that a heating or cooling effect can be obtained for the user based on current conditions or his input comfort preferences.

The sensors 70 may be provided as any type of pressure sensor 71, optic sensor 72, movement sensor, noise sensor 73 temperature sensor 74, ambient light sensor 75 or computing/processing sensor 76. In any case, the sensors 70 may include transmission/reception (T/R) units that are disposed in signal communication with the networking unit 33 of the computing device 30. The sensors 70 are generally configured to sense user profile attributes in the peripheral devices 40, the second support element 50 and the surrounding elements 55 and to report the results of the sensing to the computing device 30 by way of the T/R units.

As an example, as shown in FIGS. 2 and 6, the sensors 70 may include pressure sensors 71 disposed in the seat cushion of the chair 51. In this case, the pressure sensors 71 may sense a weight of the user so as to update the user profile if need be and may also sense a distribution of the user's weight so as to determine whether the user is sitting comfortably or slouching. As another example, the sensors 70 may include optic sensors 72 that sense a relative position of the user with respect to the monitor 41 so as to determine whether the user's eyes are level with the monitor 41 or not. As yet another set of examples, as shown in FIG. 2, the computing/processing sensor 76 may be provided in the computing device 30 to sense the current user activity (e.g., reading or typing) and the noise sensor 73, the temperature sensor 74 and the ambient light sensor 75 may be disposed in a room or office where the active workstation 10 is deployed to sense noise levels, temperatures and ambient light levels therein. In such cases, the door 550 can be closed if it is too noisy for the user to concentrate on his current activity while the window shade 551 can be lowered if it is too hot, if the sun is shining directly into the corresponding window or if the ambient light level is inappropriate for the current user activity (e.g., typing/reading or watching a video).

Although the description provided above relates to a single active workstation 10 with a single user, it is to be understood that the description can be applied to multiple workstations having varied peripheral devices and support elements for multiple users. Thus, when a given user moves from the active workstation 10 of FIGS. 1 and 2 to a normally non-active workstation 100 (see FIG. 7), such as an airplane seat, certain features of the active workstation 10 can be effectively transferable with the user. That is, the normally non-active workstation 100 can be rendered at least partially active.

Figure 7:
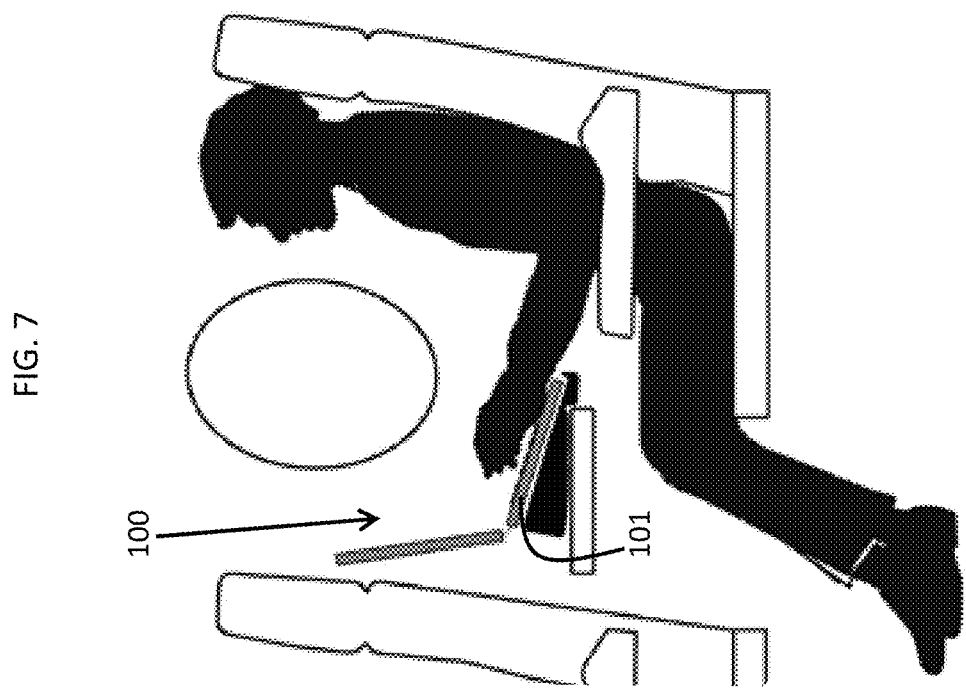
FIG. 7 is a side view of a non-active workstation occupied by a user with the computing device of FIG. 3 in accordance with embodiments.

For example, with reference to FIG. 7, if the user brings a laptop computer 101 with him on the airplane and loads the executable instructions and his user profile into an appropriate application on the laptop computer 101, the processing unit of the laptop computer 101 may take the following exemplary actions. First, the processing unit may sense a body position of the user by way of the laptop computer 101's camera and determine at a second action that the user is slouching. At this point, although the processing unit would not normally be capable of communicating with the user's airplane seat (although this is certainly possible, especially in first or business class seats), the processing unit may be able to suggest to the user that he bring his seat forward or find something to rest his feet on by way of instant messaging or some suitable system of alerts or warnings.

Figure 8:
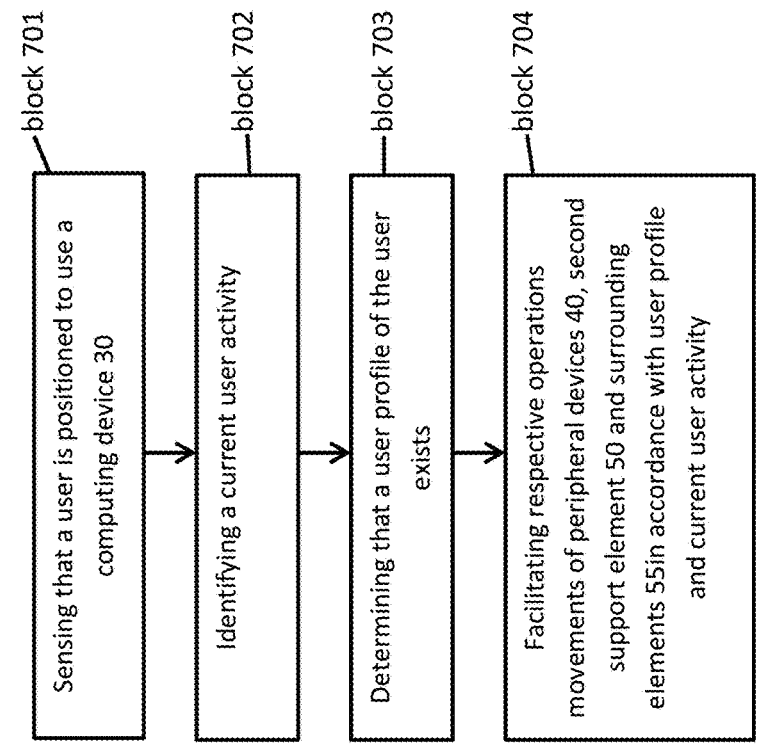
FIG. 8 is a flow diagram illustrating a method of operating an active workstation in accordance with embodiments.

With reference to FIG. 8, a computer-implemented method of controlling an active workstation 10 is provided. The computer-implemented method includes sensing that a user is positioned to use a computing device 30 at block 701 (e.g., by the user being identified by the optic sensor 72), identifying a current user activity at block 702, determining, at the processing unit 31 of the computing device 30, that a user profile of the user exists at block 703 and, in an event that a user profile of the user exists, facilitating, at the processing unit 31 at block 704, respective operations and movements of the peripheral devices 40, the second support element 50 and the surrounding elements 55 in accordance with the user profile and the identified current user activity. As noted above, the facilitating of the respective operations and movements of the peripheral devices 40, the second support element 50 and the surrounding elements 55 may be achieved by commands issued to the servo elements 60 or by suggestions/instructions provided to the user to execute the movements manually.

Figure 9:
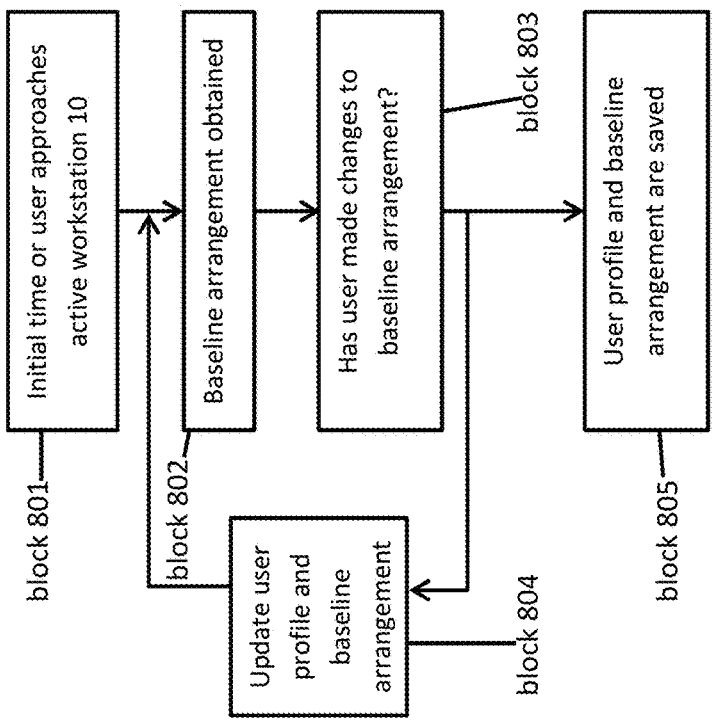
FIG. 9 is a flow diagram illustrating further embodiments of the method of FIG. 9.

In any case, with reference to FIG. 9, at an initial time or when the user approaches the active workstation 10, at block 801, a baseline arrangement of the active workstation 10 may be obtained at block 802. This baseline arrangement may include a repositioning of the monitor 41, the mouse 42, the keyboard 43 and the chair 51 to insure that the user sits in an ergonomically comfortable and appropriate position with his eyes level with the display portion of the monitor 41. At this point, the user may input changes to the baseline arrangement through the GUI 410 or by simply moving or repositioning the peripheral devices 40 or the second support element 50 at block 803. Such moving or repositioning may be done by the user to various comfort features (e.g., lumbar support of the chair 51). The user profile and the baseline arrangement may then be updated to reflect the user's inputted changes as exemplifying his comfort preferences or other attributes at block 804. If no changes are input and the user indicates that the baseline or current arrangement of the active workstation 10 is acceptable, the user profile and the current arrangement of the active workstation 10 are saved at block 805. Subsequently, if the arrangement is modified due to another user using the active workstation 10, the saved arrangement for the user can be re-established upon the user's return.

The active workstation 10, as described above, can be adaptive and learn the needs of users based on the length of time they work and if the users specify that a specific physical injury or ailment is ongoing in order for the active workstation 10 to provide extra/less support. In addition to the description provided above, the sensors 70 may be able to provide for a detection mechanism for a number of issues and the servo elements 60 can be set to automatically rectify those issues. This level of awareness from the active workstation 10 can enable an ability of the active workstation 10 to place items that are being used more often in more ergonomically optimal positions in order to eliminate twisting (telephones and reference books), while hiding less used utensils, an ability of the active workstation 10 to increase user support over time or when the user gets "antsy" or seems to be working very hard such that slouching can be rectified, an ability of the active workstation 10 to apply heating or cooling therapy to the user at injuries or sore regions and an ability of the workstation 10 to respond to certain stimuli, such as vibrations caused by the user's current activities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of controlling an active workstation, the computer-implemented method comprising:
   sensing that a user is positioned to use a computing device;
   identifying a current user activity;
   determining, at a processing unit of the computing device, that a user profile of the user exists; and
   in an event that a user profile of the user exists, facilitating, at the processing unit, respective operations and movements of peripheral devices, a second support element and surrounding elements in accordance with the user profile and the current user activity, wherein:
   the user profile comprises data reflective of a user size and weight, user physical limitations, user injuries and user comfort preferences,
   the peripheral devices comprise a monitor having a height-adjustable display portion, a mouse and a keyboard and are movably disposed on a first support element and coupled to the computing device,
   the second support element comprises a chair that is heated or cooled and movable along a floor proximate to the first support element, a dimmable light fixture and a footrest,
   the surrounding elements comprise a pivotable door and a raised or lowered window shade, and
   the facilitating comprises activating and operating actuators that are respectively operably coupled to:
   the monitor to adjust a height of the display portion,
   the chair to move the chair along the floor,
   the light fixture to dim light emitted thereby,
   the door to pivot the door, and
   the window shade to raise or lower the window shade.

2. The computer-implemented method according to claim 1, wherein the user profile is one or more of persistent, updateable and time-variant.

3. The computer-implemented method according to claim 1, further comprising initiating, at the processing unit, a low power operational mode of the computing device.

* * * * *